United States Patent
Saliba (10) Patent No.: US 7,859,786 B2
(45) Date of Patent: *Dec. 28, 2010

(54) ULTRA HIGH TRACK DENSITY ADAPTIVE HEAD CORE TRACK PITCH CONTROL

(75) Inventor: George A. Saliba, Boulder, CO (US)

(73) Assignee: Quantum Corporation, San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/341,950

(22) Filed: Dec. 22, 2008

(65) Prior Publication Data

US 2009/0141389 A1 Jun. 4, 2009

Related U.S. Application Data

(62) Division of application No. 11/255,519, filed on Oct. 20, 2005, now Pat. No. 7,486,464.

(51) Int. Cl.
*G11B 15/18* (2006.01)
(52) U.S. Cl. .................................................. 360/71
(58) Field of Classification Search ............... None
See application file for complete search history.

(56) References Cited

U.S. PATENT DOCUMENTS

| | | | |
|---|---|---|---|
| 4,110,799 A | 8/1978 | Bergmans et al. |
| 4,349,849 A | 9/1982 | Satoh |
| 5,153,785 A | 10/1992 | Muranushi et al. |
| 5,371,638 A | 12/1994 | Saliba |
| 5,379,165 A | 1/1995 | Pahr |
| 5,481,417 A | 1/1996 | Yokoyama et al. |
| 5,500,777 A | 3/1996 | Hasegawa et al. |
| 5,519,554 A | 5/1996 | Todd et al. |
| 5,523,904 A | 6/1996 | Saliba |
| 5,602,688 A | 2/1997 | Yokoyama et al. |
| 5,675,448 A | 10/1997 | Molstad et al. |
| 5,774,293 A | 6/1998 | Stupp |

(Continued)

FOREIGN PATENT DOCUMENTS

DE  30 23 738 A1  1/1981

(Continued)

OTHER PUBLICATIONS

European Search Report mailed on Apr. 4, 2007, for European Patent Application No. 06255391.2, six pages.

*Primary Examiner*—K. Wong
(74) *Attorney, Agent, or Firm*—Baker Botts L.L.P.

(57) ABSTRACT

Apparatuses and methods for adjusting the track pitches of the tracks on a data storage tape. In one variation, the method comprises adjusting the observed pitch between the tracks by applying variable amounts of pressure on the surface of the tape. In another variation, the pressure is applied to a localized region on the tape. The pressure can be modulated to induces a change in the physical characteristic of the tape in and around the area where pressure is applied. In another aspect, an apparatus is configured with a magnetic read-head for detecting written tracks on a magnetic tape, and an actuator is provided to apply pressure on the tape to control the track pitch of the written tracks.

8 Claims, 10 Drawing Sheets

U.S. PATENT DOCUMENTS

| | | | |
|---|---|---|---|
| 5,923,494 A * | 7/1999 | Arisaka et al. | 360/78.02 |
| 6,108,159 A | 8/2000 | Nute et al. | |
| 6,141,174 A | 10/2000 | Judge et al. | |
| 6,222,698 B1 | 4/2001 | Barndt et al. | |
| 6,545,834 B1 | 4/2003 | Melbye | |
| 6,781,784 B2 | 8/2004 | Peterson | |
| 6,937,425 B2 | 8/2005 | Knowles et al. | |
| 7,099,102 B2 | 8/2006 | Saliba et al. | |
| 7,359,160 B2 * | 4/2008 | Koga et al. | 360/291 |
| 2005/0088776 A1 | 4/2005 | Saliba et al. | |
| 2005/0094308 A1 | 5/2005 | Mahnad et al. | |
| 2006/0238924 A1 | 10/2006 | Gatzen | |
| 2007/0091499 A1 | 4/2007 | Saliba | |

FOREIGN PATENT DOCUMENTS

| | | |
|---|---|---|
| EP | 1 378 891 A1 | 1/2004 |

* cited by examiner

ULTRA HIGH TRACK DENSITY ADAPTIVE HEAD CORE TRACK PITCH CONTROL

RELATED APPLICATIONS

This application is a divisional application of U.S. patent application Ser. No. 11/255,519, filed on Oct. 20, 2005, the disclosure of which is incorporated herein by reference in its entirety.

FIELD OF THE INVENTION

The invention is related generally to the field of data storage systems. More particularly, the present invention is related to methods and apparatuses for controlling track pitch while writing and/or reading from a data storage tape.

BACKGROUND

Magnetic tape servo tracking systems' accuracies continue to improve over time, where currently, the traditional servo error, PES (Position Error Signal), is no longer the most significant tracking error. Many tape servo and tracking technologies are able to demonstrate performance capability in the sub one micron for PES errors.

In examining the contribution of position errors to the total off-track budget, it is evident that core pitch and track pitch mismatch fast becoming the dominant limitation. Unfortunately, the pitch related errors are embedded into the multi-channel flexible tape's geometrical limitations, and it is well understood that traditional servo control have difficulties in correcting pitch related errors as caused by the read-head or media. For example, typical off-track component caused by pitch error is in the range of 1-2 microns, and pitch error is by far the largest component of off-track error in the next generation tape drives. While this error may be insignificant in a tape drive within an error budget in the range of 8-10 microns, the same error would be unacceptable for next generation products with much higher track density.

It is also important to note that advances in tape guide and improvements in servo technology as applied to current tape systems are fast approaching the point of diminishing return. For example, in a guiding and servo system that could reduce the position error by half, the benefit to the system is a little more than a fraction of a micron (e.g., 0.1-0.2), as only one core could benefit. However, the "mismatch" between the tape tracks and head cores is at least one order of magnitude higher. Therefore, in the next generation systems the track pitch error is a major limiting factor towards increasing track densities.

In a system with dedicated servo technologies that use "surrogate servo sensors", such as optical or magnetic heads, the accuracy is further limited by the system's inability to observe this mismatch as seen by the various data transducers or head cores. Therefore, only the static portion of the error could be corrected. The system would not be able to accommodate the dynamic changes in track pitches along the length of the tape.

In addition, it is well known in the tape industry that mismatch between the read-head (e.g., head cores, etc.) and the multiple data tracks written on a given tape can be a significant contributing cause of off-track error. Typically mismatch can be caused by two factors. First, when data is interchanged between two drives, the respective heads introduce core pitch mismatch between the two written data sets. With the advances of thin film head technology, mismatch has been reduced in comparison with traditional ferrite heads designs. However, at ultra high track densities, such as 10K TPI (Tracks Per Inch) and beyond, this mismatch becomes very significant. The second mismatch error contributor, which can occur even at lower TPI, is the differences in the expansion characteristic between the head and tape media due to environmental changes. The media can expand significantly due to thermal and/or hydroscopic variations.

Therefore, there is a need for methods and apparatuses that permit a magnetic tape drive to compensate for the dynamic changes in track pitches on the magnetic data storage tapes. In particular, the ability to adaptively modify track pitches of the magnetic tape to match the transducers on a magnetic read-head can enhance the performance of tape drives that utilize magnetic tapes with high track density.

SUMMARY OF THE INVENTION

Disclosed herein are apparatuses and methods for adjusting the track pitches of the tracks on a tape media. In one example, the method comprises adjusting the observed pitch between the tracks by applying variable pressure gradient on the surface of the magnetic tape. In one variation, the pressure is applied to a localized area on the magnetic tape. The pressure is modulated to induce a change in the physical characteristic of the tape in and around the area where the pressure is applied. For example, as a pressure is applied onto the tape by an actuator stretching a local surface region, the distance across the width of the tape expands and "pushes apart" the written tracks in this region. As the pressure being applied by the actuator is decreased, the local surface region on the tape relaxes and "pulls together" the written tracks in this region.

This method can be implemented with active control and/or adaptive response, such that track pitches for the tracks to be read by the magnetic read-head can be expanded or contracted in order to match the tracks to their corresponding magnetic transducers (e.g., magneto-resistive sensors, etc.) on the read-head. "Match" as used herein means adjusting the tracks so that the positions of the tracks correspond to the positions of the magnetic transducers, such that data on each of the tracks can be read by a corresponding magnetic transducer on the read-head.

By continuously monitoring the track pitch on the tape being read, the magnetic tape drive can be adaptively (e.g., through feed-back control) stretched or relaxed in the tape media (within an acceptable operating limits) in a localized region being read by the magnetic read-head to improve the alignment between the tracks on the magnetic tape with transducers on the magnetic read-head. In one variation, an algorithm (e.g., interpolation, fuzzy logic, neural network, etc.) can be implemented to calculate a best fit between the tracks on the magnetic tape with their corresponding magnetic transducers on the read-head.

In another variation, a controller is implemented to monitor the changes in track pitches along the length of the tape as the data on the tape is being read. As the track pitches on the tape changes, an actuator is utilized to expand or contract the tape in a localized region, and as a consequence, inducing the tracks in this localized region to either move away or move towards each other in such a way as to maintain correspondence between the tape tracks and the magnetic transducers on the read-head. For example, the controller can be configured to continuously monitor the track pitches and adjust the track pitches such that an approximate fit between the tracks and their corresponding magnetic transducers on the read-head is maintained as the data is downloaded from the tape.

In one application, the track pitch control function can be applied to correct expansion errors as measured by a pre-written servo tracks or FAF/CAF (Fast Access Format/Course Alignment Field) type calibrations. In another variation, the track pitch control function can be applied in a system without pre-written servo tracking technologies, such as an auto tape servo. The auto-servo system, such as one disclosed in U.S. patent application Ser. No. 11/084,412 entitled AUTO-SERVO TAPE SYSTEM AND ASSOCIATED RECORDING HEAD, is capable of measuring the as written pitch error from the actual data tracks and can have more actual information than the surrogate type servo tracking as measured by constant pitch dedicated servo tracks, which are preset during the factory servo writing process. In yet another variation, embedded servo technology, such as the write and/or read servo, is combined with the track pitch control function, to allow the tape drive to detect and correct off-track error, as well as the mismatch between the track-pitches on the tape and the spacing separating the magnetic transducers on the magnetic read-head (e.g., head core pitch).

These and other embodiments, features, and advantages of the present invention will become more apparent to those skilled in the art when taken with reference to the following more detailed description of the invention in conjunction with the accompanying drawings that are first briefly described.

BRIEF DESCRIPTION OF THE DRAWINGS

FIG. 7A illustrates another example of utilizing an actuator to modify the track pitch on a set of given tracks. In FIG. 7A, the actuator is shown disengaged from the surface of the tape, and the two outer tracks on the tape are miss-aligned with the two outer transducers on the read-head.

FIG. 18 illustrates another approach where varying amounts of pressure are being applied across the contacting surface of the actuator. As shown in FIG. 18, a single actuator is configured with a plurality of elements to deliver varying amounts of pressure across the distal tip of the actuator.

DETAILED DESCRIPTION OF THE INVENTION

The following detailed description should be read with reference to the drawings, in which identical reference numbers refer to like elements throughout the different figures. The drawings, which are not necessarily to scale, depict selective embodiments and are not intended to limit the scope of the invention. The detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention.

Magnetic tape drive is used herein as an example application of the track pitch control function, in order to illustrate the various aspects of the invention disclosed herein. In light of the disclosure herein, one of ordinary skill in the art would appreciate that the methods and apparatuses disclosed herein can be implemented in various other data storage tapes, including optical tapes, to adjust track pitch of the written tracks on the tape media to improve the performance of the tape drive.

It must also be noted that, as used in this specification and the appended claims, the singular forms "a," "an" and "the" include plural referents unless the context clearly dictates otherwise. Thus, for example, the term "a read-head" is intended to mean a single read-head or a combination of read-heads, "an electrical signal" is intended to mean one or more electrical signals, or a modulation thereof. Furthermore, "longitudinal dimension" as used herein means the dimension on the tap along the length of the tape, and "lateral dimension" as used herein means the dimension along the width of the tape. In addition, "track pitch" as used herein means the distance between two adjacent tracks on a tape surface. It corresponds to the tracks per inch (TPI) or the density of tracks on a data storage tape. Moreover, magnetic read-read-head means a magnetic head comprises a plurality of magnetic transducers for sensing magnetic variations on a magnetic tape. A magnetic read-head may be configured with both read and write capability. In one variation, the magnetic read-head comprises a magneto-resistive cluster head assembly having a plurality of magneto-resistive transducers capable of simultaneously reading data from sixteen separate tracks on a magnetic tape.

In one variation, the apparatus is operable to dynamically modify the region of the tape that interfaces with the read-head (e.g., head core) in an adaptive manner. For example, the track-pitch on the tape can be adjusted according to a signal representing the track pitch error (e.g., core pitch error) between the magnetic transducers on the read-head and the written track pitch on the tape. Typical thin tape media that are utilized for data recording are flexible and can expand and contract within its elastic limits. Thus, an actuator (e.g., roller, drum, displacement mechanism, pressure/force application mechanism, etc.) can be utilized to deliver a localized pressure directly onto the surface of the tap to induce expansion of the tape in a limited area on the tape. The pitch control function utilizes an actuator to induce reversible physical changes to the tape by applying a pressure/force in a vertical direction, such that the tracks on the tape are "pushed away from each other" or "pulled together towards each other" to match the magnetic transducers' distribution pattern on the read-head (e.g., the head core pitch). This technique may be particularly useful in tape drive utilizing thin tapes with high track density. The pitch control function may allow the system to make micro-adjustments with the track-pitch in a controlled manner.

Figure 1:
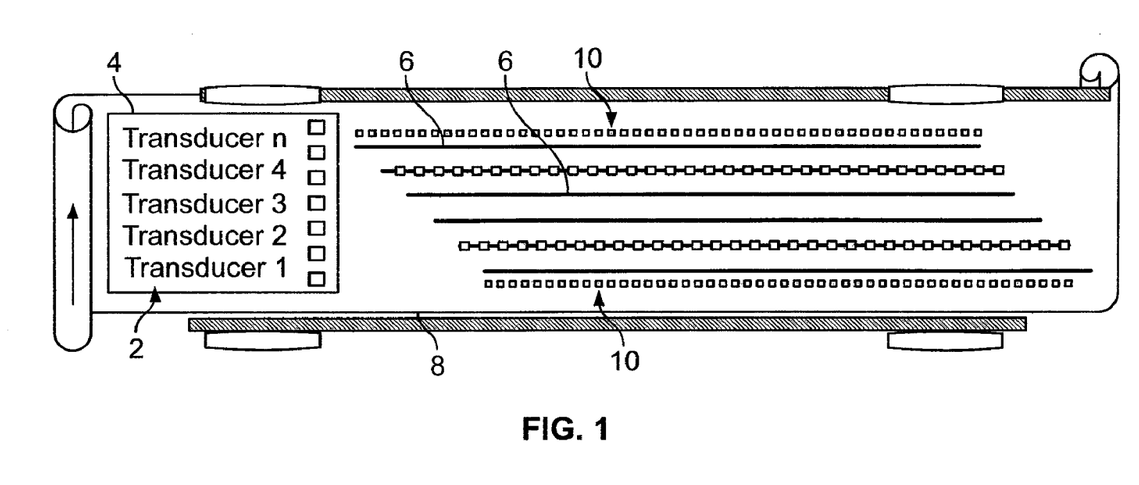
FIG. 1 illustrates one example where off-track error occurs due to mismatch between magnetic transducers on the read-head and the written tracks on the magnetic data storage tape.

FIG. 1 illustrates a current method used in DLT/SDLT tape drive to align one set of magnetic transducers 2 on a read-head 4 to a set of written data tracks 6 on a magnetic tape 8. In the example shown, the data tracks on the tape are written with a magnetic transducers having a tighter distribution pattern than the transducers 2 on the read-head 4. Thus, when best fit average is employed during the calibration or FAF/CAF, off-track error 10 can be observed. In this configuration, in order to accommodate the off-track error, the error budget requires the tracks to be written wider than otherwise needed to allow read-heads to fit into tracks written by another drive.

Figure 2:
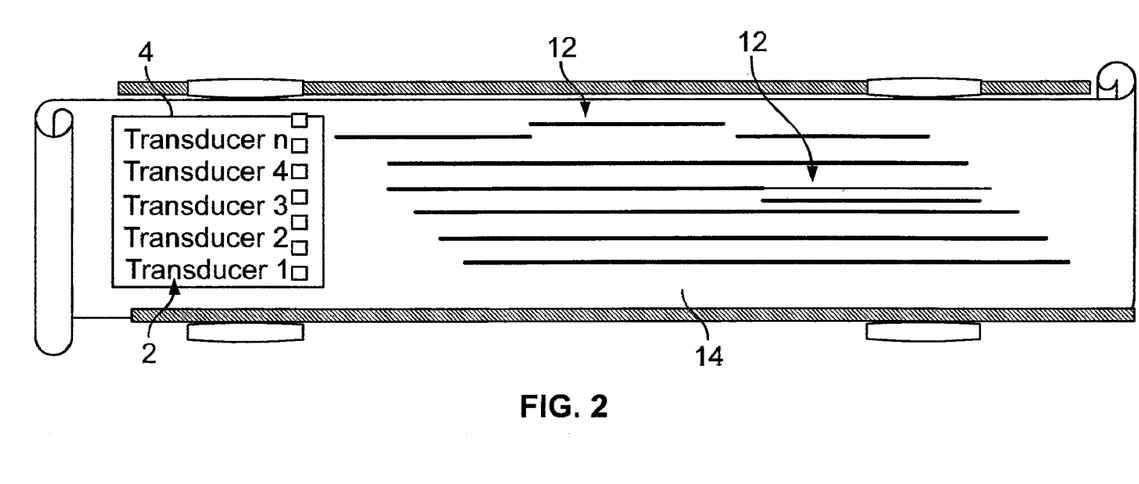
FIG. 2 illustrates another scenario where various error/noise occurs over time due to drifts/changes in written track along the length of the tape. This misalignment of tracks on the magnetic tape may be due to transfer of the tape media between different tape drives.

FIG. 2 illustrates another scenario where various error/noise 12 occur over time as the tape media interchanges between drives, or read/written are performed at different operating temperature and/or humidity. As the tape media 14 is operated under different temperature and/or humidity, the tape media will expand or contract, resulting in changes in track-pitches of the written tracks along the length of the tape. Without the capability to adjust the track-pitch, one would need to ensure that the written tracks would be wide enough to accommodate all these errors, even if the system is able to achieve perfect servo tracking.

Figure 3:
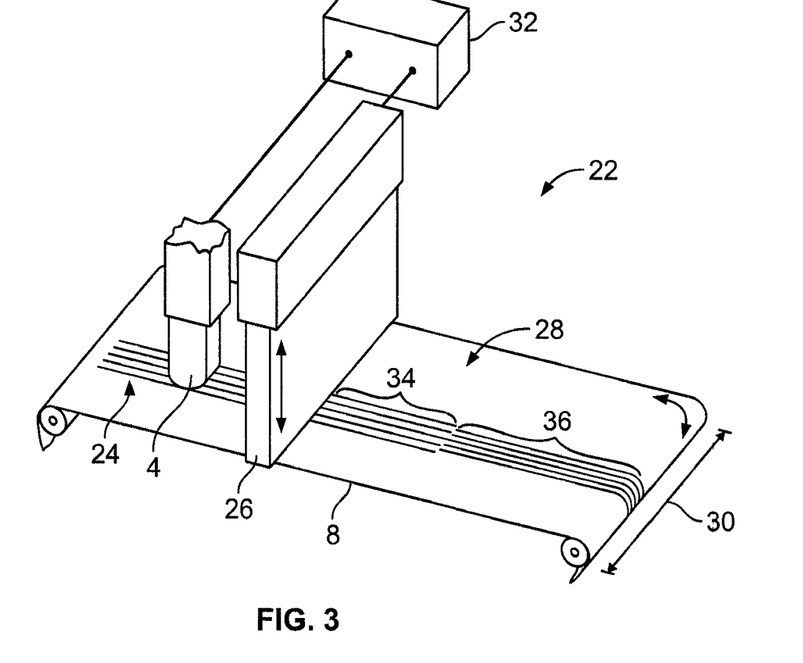
FIG. 3 illustrates one example where a transducer is implemented in a tape drive to correct variation in track pitches. As shown, the actuator can be utilized to apply a downward force onto the tape surface, which leads to an increase in localized tape tension to increase the track pitch of the written tracks on the tape.

One approach to account for these track-pitch variations is to utilize the pitch control function to modify the position of the tracks on the tape to fit the transducer pattern on the read-head. In one example, as shown in FIG. 3, the apparatus 22 comprises a magnetic read-head including a plurality of magnetic transducers for reading information from a plurality of tracks on the magnetic tape. The track 24 may include both data tracks and servo tracks. In one variation, customer data are written in the data tracks. Customer data comprises information written onto the tape by a customer or other user post manufacturing of the tape. For example, customer data may include financial and/or accounting data generated by a company during normal course of business. The company (i.e., customer) then downloads these data onto a formatted tape media having servo tracks pre-written on them.

An actuator 26 is positioned next to the magnetic read-head 4. The actuator is capable of applying pressure on a top surface 28 of the magnetic tape 8. In this particular variation, the actuator is configured to apply pressure across the width 30 of the tape. An electronic controller 32 is connected to both the actuator and the magnetic read-head 4. The controller receives information regarding track pitch (e.g., track pitch error signal, etc.) and/or track position information from the magnetic read-head, then controls the actuator 26 to apply a pressure onto the magnetic tape 8 to change the track pitch. The controller receives a feedback from the magnetic read-head 4 regarding the changes in track pitch due to the pressure, and adjusts the amount of pressure being applied by the actuator 26. This feedback loop continues until the track pitch is adjusted to match the magnetic transducers distribution pattern on the magnetic read-head 4, such that data/information in the data and/or servo track on the magnetic tape can be read by the magnetic transducers.

In one variation, the magnetic read-head includes eight magnetic transducers for simultaneously reading data from eight different tracks on the tape. The tape drive apparatus first utilizes a servo track to align the eight tracks on the tape with the magnetic read-head. Technology for utilizing a servo track to align tracks on the magnetic tape with the read-head is well known to one of ordinary skill in the art. Optical alignment technology, which is also well known to one of ordinary skill in the art, can also be implemented to provide general alignment (e.g., control lateral movement of the tape to center the tape) of the magnetic tape with the read-head.

Once a rough alignment is achieved, then the controller 32 utilizes the actuator 26 to adjust the track pitches on the tape 8, such that the track pitches approximate the spacing between the transducers on the read-head 4. In one application, the controller 32 continuously monitor track pitch and/or track position information receive from the magnetic read-head, and continuously adjust the track pitch of the tape, by modulating compression applied by the actuator, to account for variations in track pitch along the length of the tape. Thus, ensuring the tracks continue to correspond to the transducers on the magnetic read-head. In one variation, alignment utilizing the servo track, and alignment utilizing the actuator, are performed in parallel. In another variation, the feedback controller utilizes a computer algorithm (e.g., fuzzy logic, neural network, digital filter, numerical modeling, adaptive learning, etc.) to determine a track pitch that best fit the transducer pattern on the magnetic read-head.

FIG. 3 shows one example where the first section 34 of the tracks 24 has wider pitches than the second section 36 of the tracks 24. In order for the read-head 4 to continue to read data from the second section 36 of the track 24 once the tape 8 has been advanced forward, the track pitches in the second section 36 would need to be expanded to match the transducers on the magnetic read-head 4. The actuator 26 can be advanced downward to increase the pressure on the tape 8, and thereby increasing the tension in a local region surrounding the area where the actuator 26 contacts the tape 8. As the tape tension is increased in the local region, the distances between the tracks will increase in this local region.

Figure 4A:
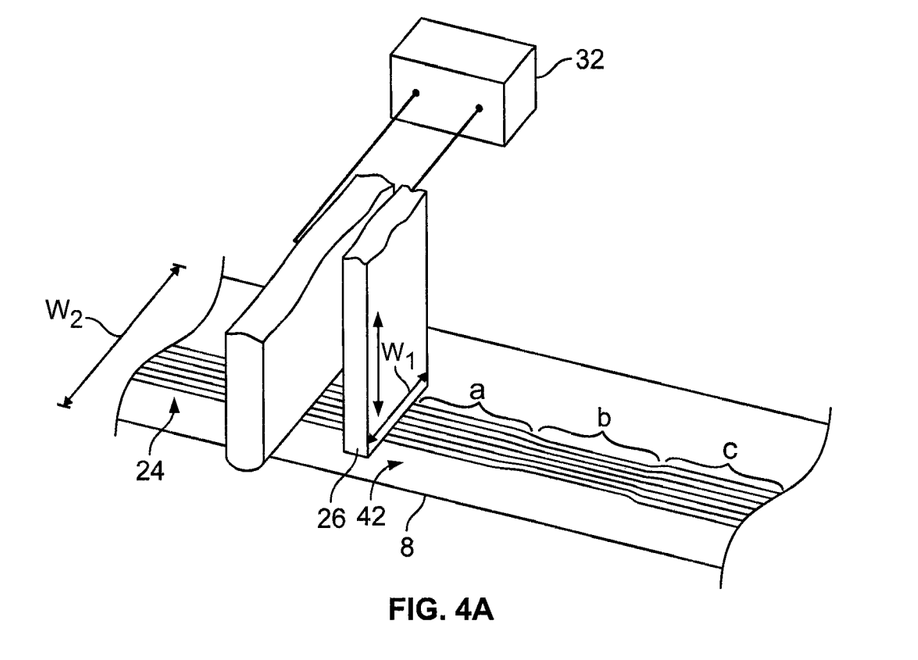
FIG. 4A is a perspective view illustrating another variation in implementing an actuator to deliver a localized pressure on the magnetic tape. In this variation, the lateral dimension, $W_1$, of the portion of the actuator that contacts the tape is less than the width of the tape, $W_2$.

Referring to FIG. 4A, another variation of implementing an actuator 26 to deliver a localized pressure on a magnetic tape 8 is illustrated. In this variation, the lateral dimension, $W_1$, of the actuator 26 that contacts the tape 8 is less the width of the tape, $W_2$. As the actuator is displaced towards the surface 42 of the tape 8, tape tension in a localized area adjacent to the actuator contact area will be increased. By changing the tape tension locally, one can adjust the track pitches locally. As one of ordinary skill in the art would appreciate, two or more channels may be provided on a magnetic tape, and each channel can include a plurality of tracks (e.g., 8 tracks, 16 tracks, 32 tracks, etc.). By increasing tape tension locally, the user can selectively, modify track pitch for a specific channel. In another variation, an actuator 26 can be configured to modify track pitch for two or more channels at the same time.

Localization of tension variations induced by the actuator may minimize tear and wear to the tape in comparison to a system that stretches the complete tape. In particular, damages to the edges of the tape may be avoided since the actuator does not come into direct contact with the edges of the tape. Furthermore, applying an actuator to a localized area may allow the system to deliver fine tension adjustments on the tape, and thus allowing the system to fine tune the track pitches by making very small tension adjustments. In addition, since the pressure is delivered locally, a small amount of pressure may be enough to induce substantial change in the track pitch in the immediate area surrounding the pressure application location. In comparison, a system that applies pressure or tension to the length of the tape may require a substantially larger amount of pressure to induce the same amount of track changes in comparison to system configured to modulate tension of the tape locally. Therefore, the system that stretches the complete tape may decrease the operating life expectancy of the tape media. Moreover, new generation of tape media with ultra thin configuration may be susceptible to damage or even complete failure when exposed to high levels of tension.

FIG. 4A illustrates one example where the track comprises three sections with varying track pitches in one of the channels on the tape. The track pitches contract from section "a" to section "b", and then expand from section "b" to section "c". These variations may be due to temperature/humidity change or other factors that affect the tape property during the data recording session. In order for the read-head to properly trace the various tracks from section "a" through section "c", the controller monitors the track pitch error information, which is based on information read by the magnetic transducers in the read-head, and corrects the track pitches seen by the read-head by modifying a pressure on the tape to expand or contract the distances between the tracks.

Figure 4B:
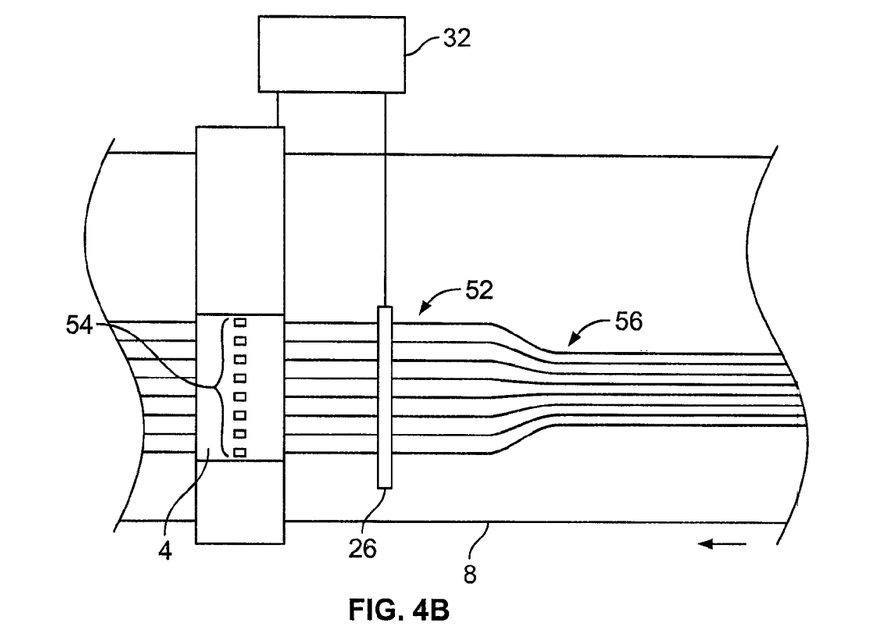
FIG. 4B is a top view illustrating one example where an actuator is utilized to maintain alignments between magnetic transducers on the read-head and the written tracks having varying regions of track pitches.

FIG. 4B illustrates one example where a servo track is utilized to align the channel 52 with the read-head 4. The actuator 26 maintains a pressure on the tape 8 to maintain the track pitches to match the transducers' pattern 54 on the read-head 4. As the tape 8 is advanced to the point where the section 56 with smaller track pitches is scanned by the read-head, the controller determines a change in track pitch that has occurred based on information provided by the read-head and modify the pressure applied by the actuator in order to compensate for the larger track pitches and maintain the alignment between the tracks and the magnetic transducers.

Figure 5:
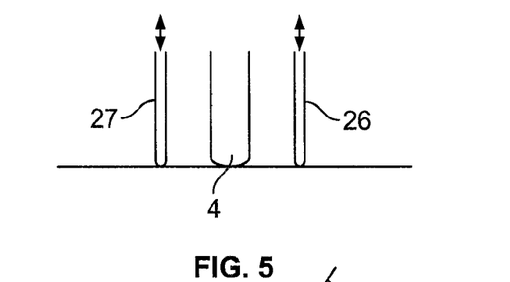
FIG. 5 illustrates another combination, where two actuators are implemented to apply pressure, both in front and behind the magnetic read-head.

The actuator may be placed in front or behind the magnetic read-head. In one variation, the actuator 26 is placed in front of the magnetic read-head 4 in relation to the direction of the tape advancement, as shown in FIG. 4B. In another variation, the actuator is placed behind the read-head. In yet another variation, two actuators 26, 27 are implemented to apply pressure both in front and behind the magnetic read-head 4, as shown in FIG. 5. The two actuators 26, 27 may be configured to apply pressure simultaneously or they may be controlled independently. In configuration with either single or multiple actuators, a lever (e.g., a L-trigger, etc.) may be further incorporated to assist with maintaining contact between the tape and the read-head.

Figure 6:
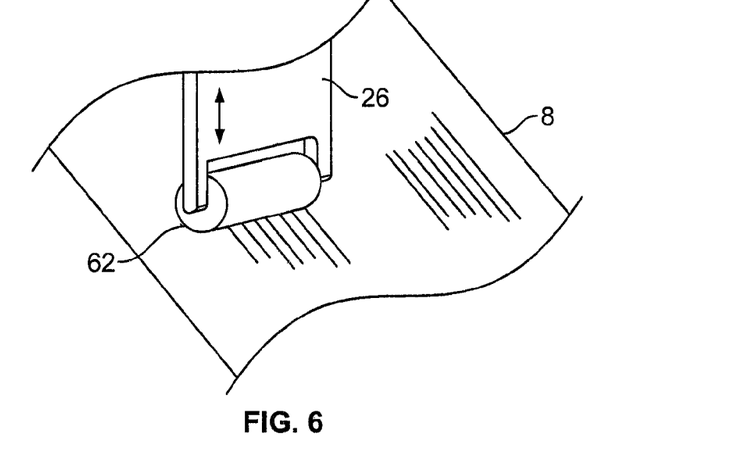
FIG. 6 illustrates yet another variation wherein a roller is implemented on the actuator to apply pressure onto the surface of the tape.

Furthermore, one of ordinary skill in the art having the benefit of this disclosure would appreciate that the actuator may be configured with various interfaces to engage the tape surface. In one variation, a roller 62 is implemented on the actuator 26 to apply pressure on the tape 8, as shown in FIG. 6. In another variation, the distal end of the actuator comprises a blunt pin being displaced into and out of the tape surface. In another variation, an independent motor (e.g., piezo driver, step motor, other displacement mechanisms, etc.) is coupled to a pin, rod or other interface structures to apply pressure to an area on the surface of the tape. In yet another variation, a balloon or a diaphragm is inflated to apply pressure to the surface of the tape. By adjusting the amount of fluid in the balloon or the diaphragm one can control the size of the balloon or diaphragm to modulate the pressure imposed on the surface of the tape, and thereby control the track pitch.

Figure 7A:
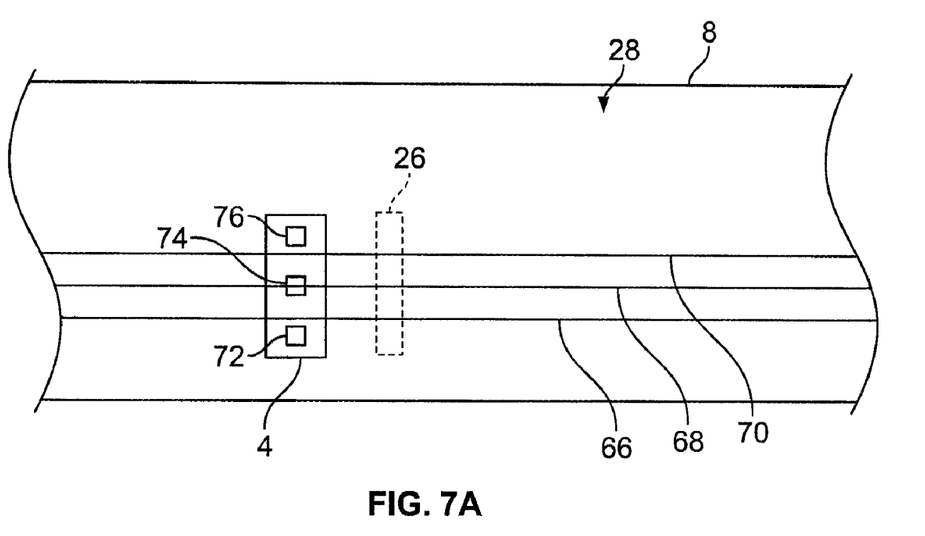
Figure 7B:
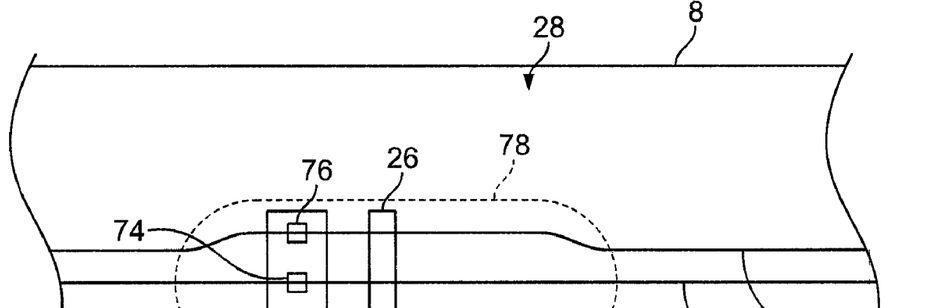
FIG. 7B illustrates the apparatus shown in FIG. 7A with the actuator depressed into the surface of the tape, causing the tracks on the tape to expand outward away from each other within a localized region of the tape, resulting in the alignment of the tracks with the transducers on the read-head.

FIGS. 7A and 7B illustrate another example of utilizing an actuator to modify the track pitch for a group of written tracks on the tape. FIG. 7A shows the actuator 26 disengaged from the surface 28 of the tape 8. The track pitches on these tracks 66, 68, 70 are narrower than the distribution of the magnetic transducers 72, 74, 76 on the read-head 4. Thus, the two outer tracks 66, 70 are misaligned with the transducers 72, 76. The tracks 66, 68, 70 may have been written onto the tape with a magnetic write-head having traducers that are more closely distributed from each other in comparison from the transducer patterns on the read-head 4. FIG. 7B shows the actuator 26 depressed into the surface 28 of the tape 8 causing the tracks 66, 68, 70 on the tape to move away from each other within a localized region 78 of the tape. As the track pitch is increased, the tracks 66, 68, 70 become aligned with the transducers 72, 74, 76 on the magnetic read-head 4.

Another aspect of the invention comprises methods for transducing data from a magnetic tape while controlling track pitch to match the transducer pattern on the magnetic read-head. In one variation, the method comprises utilizing a magnetic read-head including a plurality of transducers to simultaneously read data from a plurality of tracks on a magnetic tape, while adjusting the track pitches of tracks to improve alignment between the tracks on the magnetic tape with the transducers on the magnetic read-head. The track pitch can be adjusted by expanding or contracting the width of the tape to match each of the tracks to a corresponding transducer on the magnetic read-head. In one variation, the tracks are adjusted by varying the tape tension in a localized area of the tape. The localized area may be limited to an area on the surface of the tape where the lateral dimension is less than the width of the tape.

For example, an actuator can be used to apply pressure/force can be applied onto a localized area on the tape. By decreasing or increasing the pressure applied on the surface of the tape, the track pitch in the region immediately surrounding the localized area can be modified. In one variation, the pressure/force is applied on an area having a width (i.e., lateral dimension) that is less than 50% the width of the tape. In another variation, pressure imposed on the surface of the tape is applied on an area with a width that is less than 25% the width of the tape. In yet another variation, the pressure is imposed on the tape to cause changes in the track pitch in an area having a width of 0.5 inches or less. The actuator can be implemented to vary the track pitches of a plurality of tracks in order to determine a match between the tracks and the transducers in the read-head. For example, the actuator can continue to increase the pressure on the tape to minimize track error until an over correction is detected. The controller then releases part of the pressure imposed on the tape and bring the track pitch back to a best match point. By limiting the pressure to a localized area, the apparatus can expand (e.g., stretch) one area on the tape, while keeping the tension in the rest of the area surrounding the expanded area at a constant level. In one variation, the tape drive comprises moveable read-head and the read-head is displaced to apply pressure directly on the tape.

Figure 8:
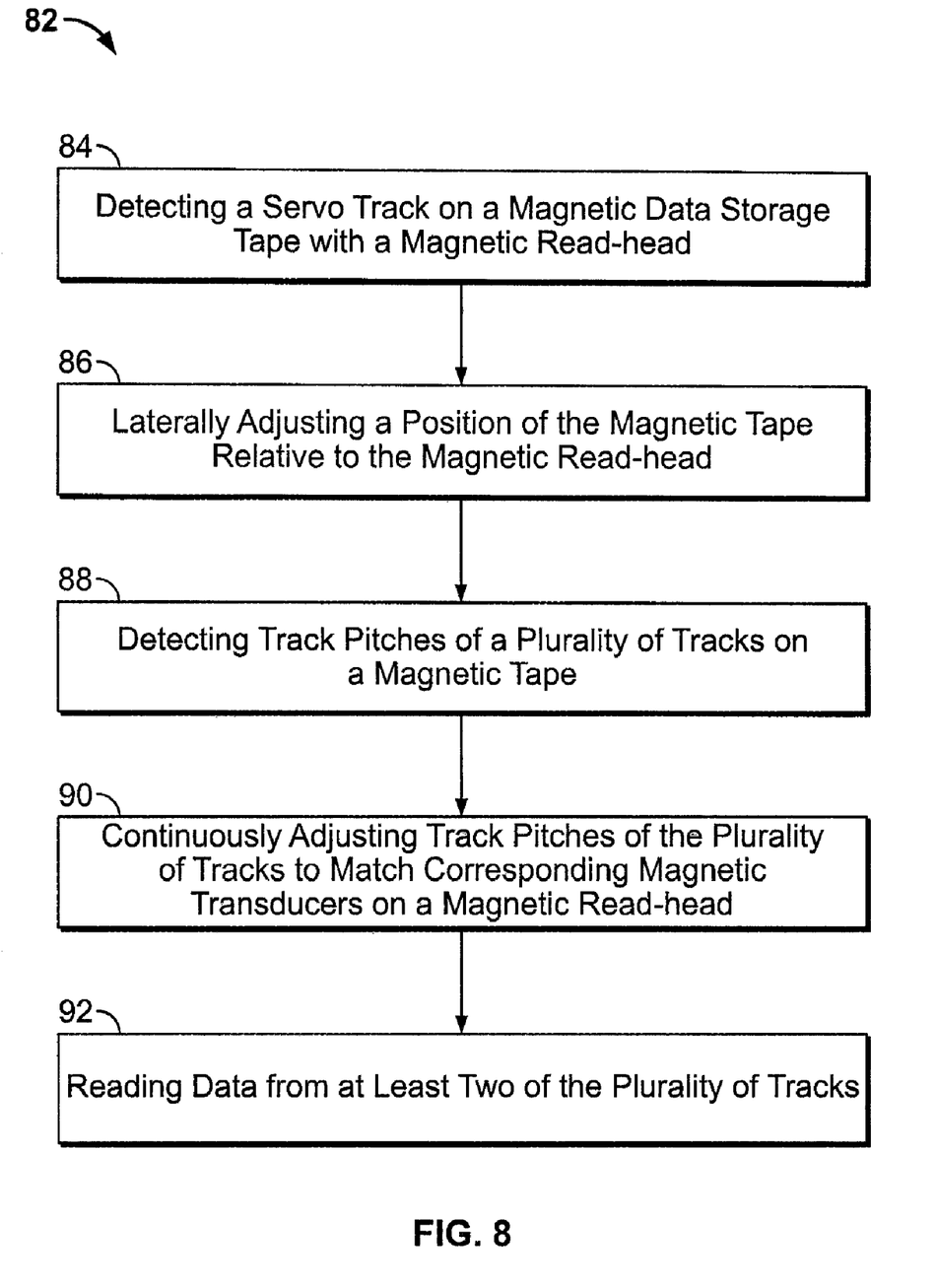
FIG. 8 is a flow chart illustrating one example of a method for controlling track pitch.

FIG. 8 illustrates yet another example of a method for controlling track pitch 82. In this example, a magnetic tape media is placed into the tape drive by the operator. The magnetic read-head in the tape drive detects at least one servo tracks in the tape drive 84, and then adjusts the position of the tape laterally to align the tape to the magnetic read-head 86. The magnetic read-head detects one or more track pitches of a plurality of tracks on the magnetic tape 88. This may be done by detecting the position of two or more tracks and then calculate the distance between the tracks. In one variation, the method comprises monitoring the position of the outer two tracks in the channel. In another variation, track pitch is determined based on the distance between two data tracks. In yet another variation, the track pitch is determined base on the distance between a data track and a servo track. In one configuration, the track information detected by the magnetic read-head is provided to an electronic circuit that calculates a track pitch error, which can include information regarding mismatch between the tracks and the magnetic transducers in the read-head. The track pitch error is provided to a control circuit, which utilizes the track pitch error to adjust the track pitches of the plurality of track on the magnetic tape.

In one variation, the control circuit continues to receive track information from the read-head and continuously adjust track pitches of the plurality of track to match corresponding magnetic transducers on the magnetic read-head 90. This configuration allows the tape drive to compensate for the variation in track pitch along the length of the tape. In another variation, once the track pitch on the tape is adjusted to correspond to the transducers on the read-head of the tape drive, the controller continues to monitor the track pitch and make necessary adjustments to keep the track pitch on the tape constant. With the track pitch adjusted to match the transducers on the read-head, the read-head can then read the information stored in data tracks on the tape 92. Examples of method and apparatus for tracking lateral tape position and detecting the position of the tracks on the tape are disclosed in U.S. patent application Ser. No. 11/084,412 entitled AUTO-SERVO TAPE SYSTEM AND ASSOCIATED RECORDING HEAD, by George A. SALIBA, file on Mar. 18, 2005, which is incorporated herein by reference for all purposes.

As one of ordinary skill in the art having the benefit of this disclosure would appreciate, the method disclosed herein can be implemented to stretch the tape in a localized region independent of the changes in the overall width of the tape. However, in one variation, mechanisms that are well known to one of ordinary skill in the art can be utilized to maintain a constant tape width, while an actuator is simultaneously utilized to adjust the stretching of the tape in a localized region on the surface of the tape to control the track pitch of the written track in this localized region.

Figure 9:
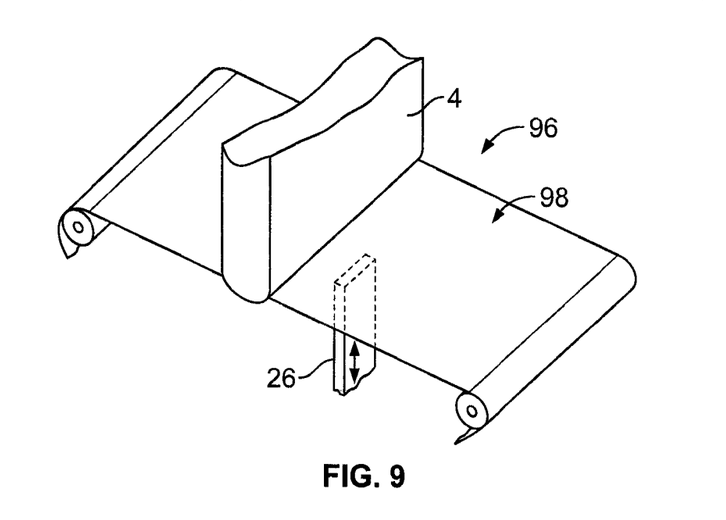
FIG. 9 illustrates another example of a read-head/actuator combination. In this example, the magnetic read-head is positioned over the top side of the tape, while the actuator is positioned to apply pressure to the underside of the tape.

Referring to FIG. 9, another example of read-head/actuator combination is illustrated 96. In this variation, the magnetic read-head 4 is positioned over the top side 98 of the tape 8 while the actuator 26 is positioned to apply pressure to the underside of the tape 8. In one variation, the actuator contacts the tape in a localized region with a lateral dimension less than the width of the tape 8. In another variation, the actuator applies pressure across the width of the tape. As discussed above, a feedback loop may be established through a control circuit (not shown) connected to both the read-head and the actuator for modulating the track pitch of the written tracks on the tape.

Figure 10:
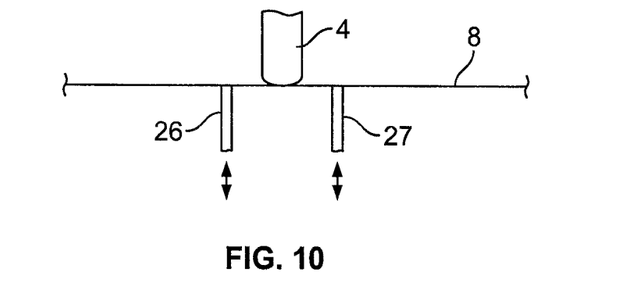
FIG. 10 illustrates yet another example of read-head/actuator combination, where two actuators are positioned on each side of the magnetic read-head to apply pressure to the surface of the magnetic tape.
Figure 11:
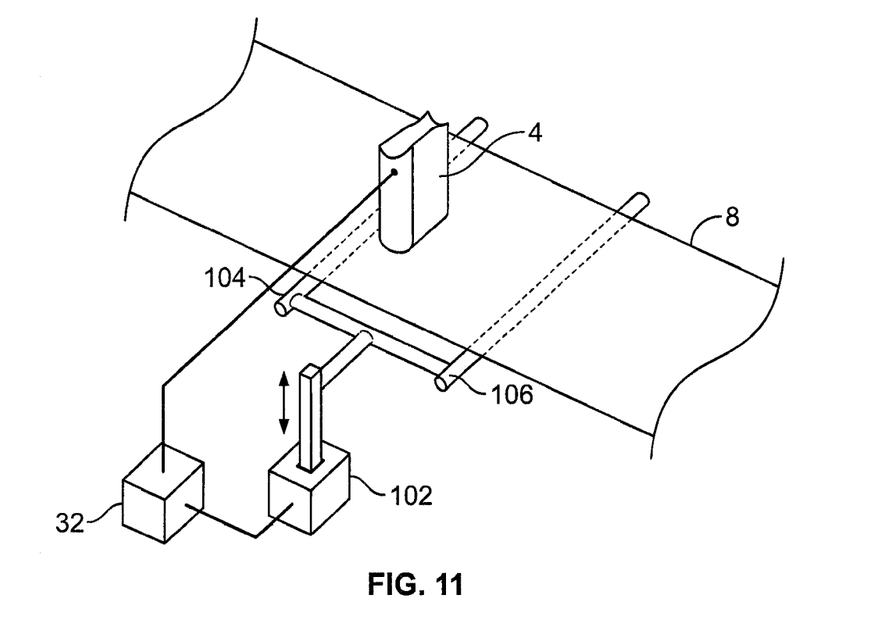
FIG. 11 illustrates another design variation, where a single displacement mechanism is configured to apply pressure at locations immediately before, and immediately after, the magnetic read-head. In this particular example, the contacting elements, which extend beyond the width of the tape, and are coupled to a displacement device.

FIG. 10 illustrates yet another example, where two actuators 26, 27 are positioned on each side of the magnetic read-head 4 to apply pressure to the surface of the magnetic tape 8. In FIG. 11, another variation, where a single displacement mechanism 102 is configured to apply pressure to the tape at a location immediately in front of, and immediately behind, the magnetic read-head 4. In this particular example, the contacting elements 104, 106, which are coupled to the displacement mechanism 102, are configured to extend beyond the width of the tape. In another example, the contacting area is limited to a region less than the width of the tape 8. As shown in FIG. 11, a controller 32 is coupled to the read-head and the displacement element to form a feedback loop, such that the controller 32 is able to monitor the track pitch and modify the pressure applied by the displacement mechanism 102 to adjust the track pitches on the tape 8.

Figure 12:
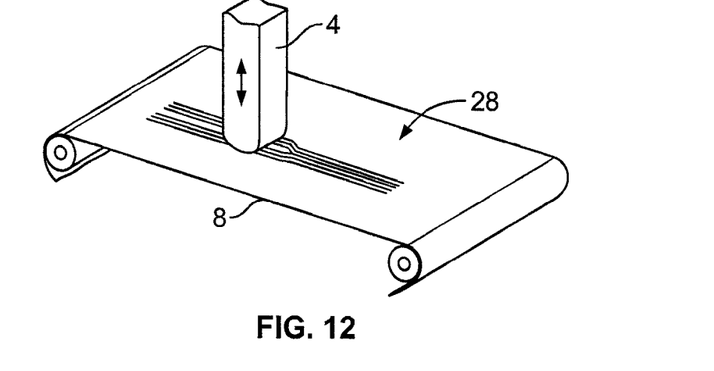
FIG. 12 illustrates one variation where the read-head itself is displaced into the surface of the tape directly to induce a change in the track pitch of the written track on the magnetic tape.

In another example, the read-head 4 itself is displaced into the surface 28 of the tape 8 directly, as shown in FIG. 12. This displacement causes local stretching/expansion of the tape 8, which leads to changes in track pitch. In one configuration, the magnetic read-head 4 is couple to an actuator that drives the magnetic read-head into and away from the tape surface. A controller (not shown) receives information regarding the position and/or track pitch of the track on the tape from the magnetic read-head 4, and determines the amount of displacement needed on the magnetic read-head 4 to generate the desired track pitch changes on the tape. In one variation, the magnetic read-head has a lateral dimension less than the width of the tape (as shown in FIG. 12). In another variation, the width of lateral dimension of the read-head structure is wider than the width of the tape.

Figure 13:
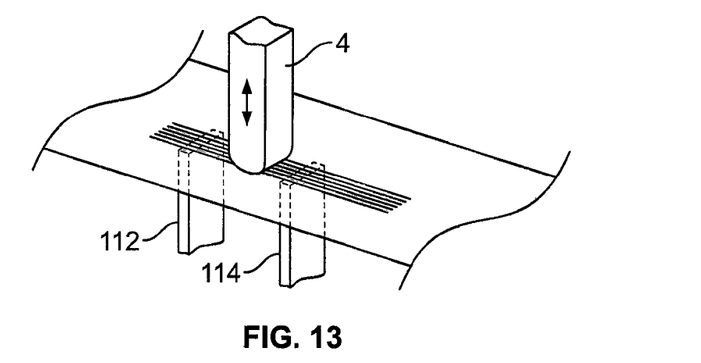
FIG. 13 illustrates one configuration where the moveable magnetic read-head is implemented along with two fixed-position counter supports, which are placed on the other side of the tape. In this example, both the magnetic read-head and the two counter supports are configured with lateral dimensions less than the width of the tape.
Figure 14:
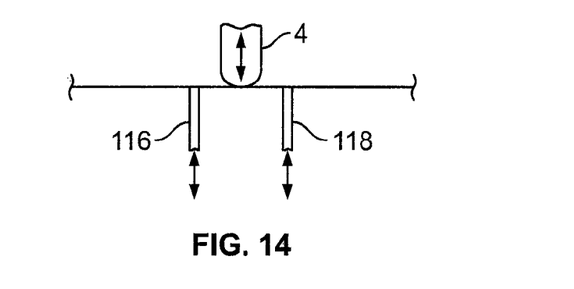
FIG. 14 illustrates another variation, where both the magnetic read-head and its corresponding counter supports are movable.
Figure 15:
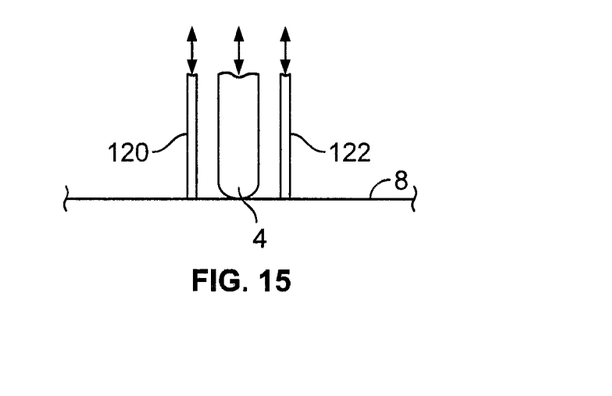
FIG. 15 shows another variation where the two actuators are provided on the same side of the tape, next to the read-head.
Figure 16:
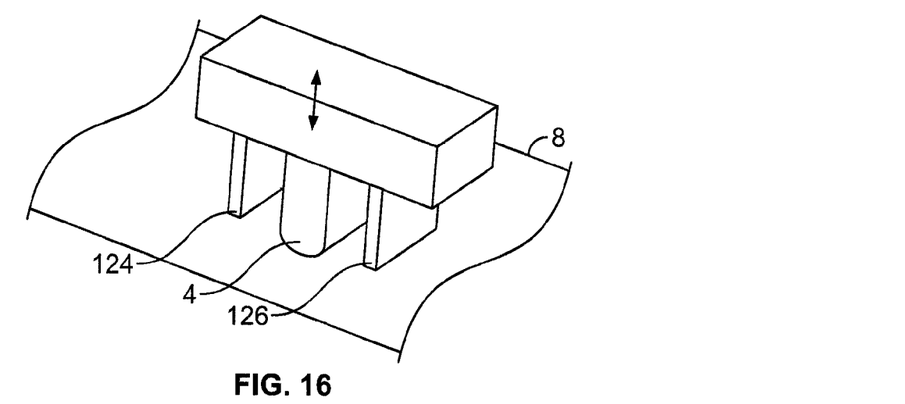
FIG. 16 shows yet another variation where the two pressure delivery elements are coupled to the magnetic read-head.

FIG. 13 illustrates another variation where the moveable magnetic read-head 4 is implemented along with two fixed-position counter supports 112, 114 placed on the other side of the tape. In the variation shown, both the magnetic read-head 4 and the two counter supports 112, 114 are configured to with lateral dimension less than the width of the tape. In one variation, the read-head structure has a lateral dimension that is wider than the width of the tape. FIG. 14 illustrates a variation, where both the magnetic read-head 4 and its corresponding counter supports 116, 118 are movable. For example, each of the two counter supports 116, 118 may include an actuator (e.g., displacement mechanism, step motor, etc.). FIG. 15 shows another variation where two actuators 120, 122 are provided next to the read-head 4 on the same side of the tape 8. In yet another variation, two pressure delivery elements 124, 126 are coupled to the magnetic read-head 4, as shown in FIG. 16. The two elements 124, 126 are positioned in front of and behind the magnetic read-head 4 along the length of the tape 8. An actuating mechanism (e.g., displacement mechanism, step motor, etc.) is coupled to the read-head 4 and the two elements 124, 126 to displace them simultaneously in a direction perpendicular to the surface of the tape 8.

Figure 17:
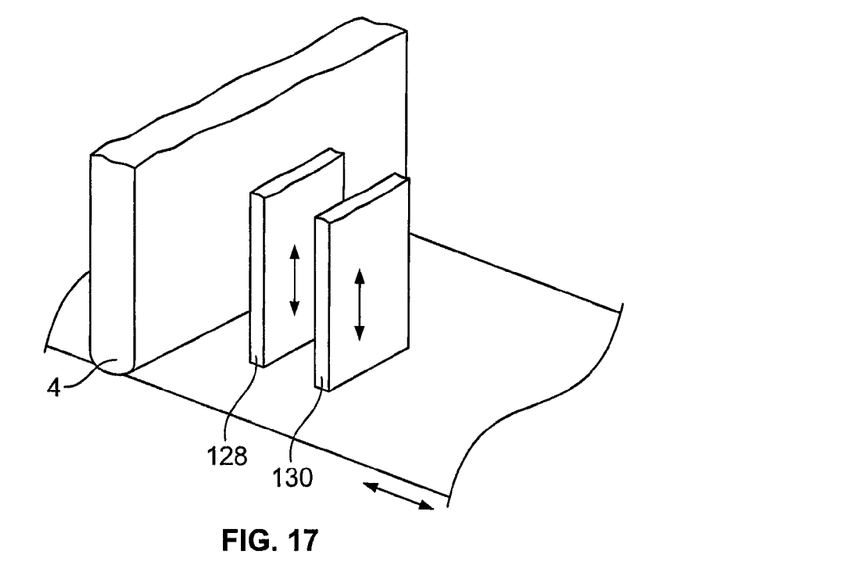
FIG. 17 shows an example where two actuators are positioned next to one another to deliver pressure onto the tape on one side of the magnetic read-head.

As one of ordinary skill in the art having the benefit of this disclosure would appreciate, two or more actuators may be implemented to provide localized pressure on the surface of the tape. FIG. 17 illustrated one example where two actuators 128, 130 are positioned next to one another to deliver pressure onto the tape on one side of the magnetic read-head 4.

Figure 18:
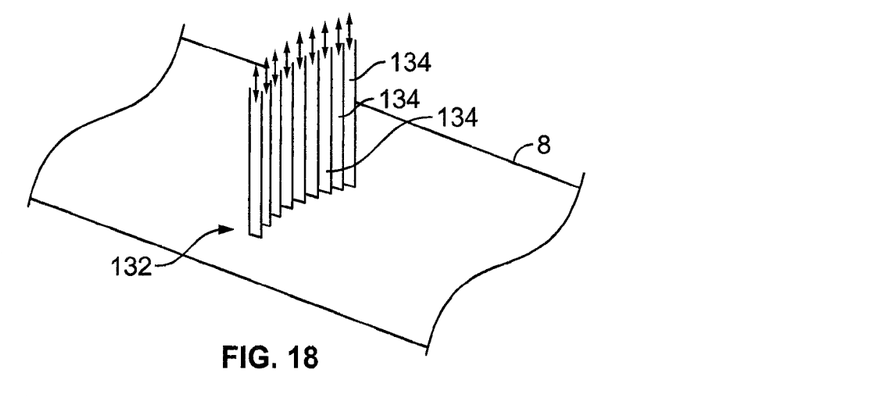
Figure 19:
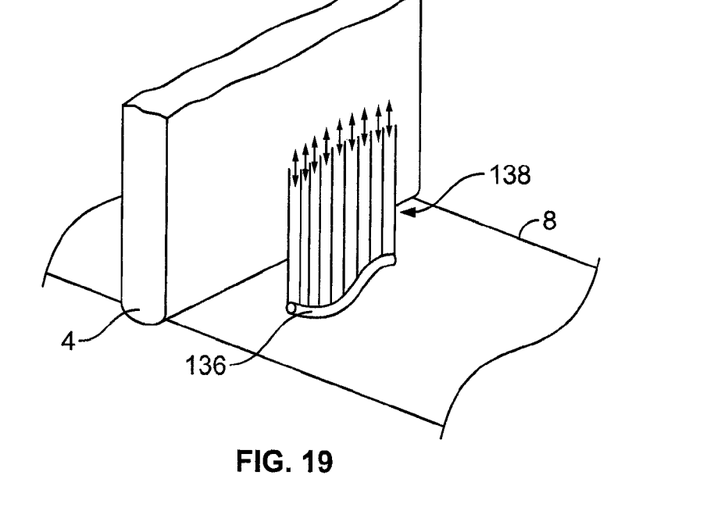
FIG. 19 illustrates one design variation where a buffering mechanism is positioned at the distal end of the actuator elements to provide a smooth force/pressure profile across the effected region on the tape.

In another example, varying amounts of pressure are delivered onto a localized area on the surface of the tape to induce variation amounts of changes in track pitch in the effected area. This design allows the user to expand the track pitch between a selective track in a give channel more than the other tracks in the same channel. For example, as shown in FIG. 18, a single actuator 132 may have multiple elements 134 to delivering varying amounts of pressure across a section of the tape 8. In one variation, multiple actuators are aligned side-by-side and controlled independently by a controller to induce the desired amount changes cross the effected area on the tape. In another variation, a buffering mechanism 136 is positioned at the distal end of the actuating elements 138 to provide a smooth distribution of force/pressure profile across the effected region on the tape 8, as shown in FIG. 19.

Figure 20:
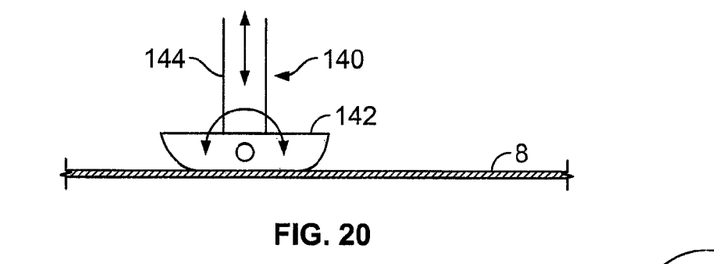
FIG. 20 illustrates another variation of an actuator for delivering varying amounts of force/pressure within a section along the width of the tape.

FIG. 20 illustrates yet another variation of an actuator 140 for delivering varying amounts of force/pressure within a section along with width of the tape 8. A cross-sectional view of a tape 8 is shown with an actuator 140 positioned over one surface of the tape. An interface element 142 is coupled to the distal end of the actuator. The interface element 142 is able to pivot relative to the main rod 144 of the actuator 140. By controlling the amount of pivot on the interface element 142, the controller is able to apply more pressure to one side of the contacting region than the other.

Figure 21:
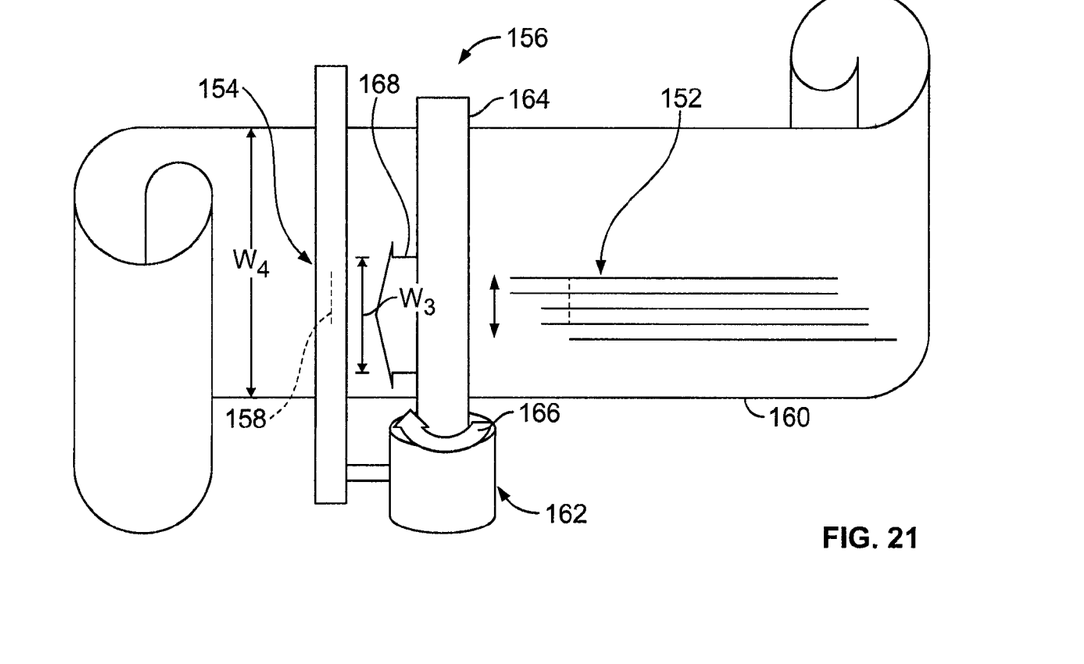
FIG. 21 illustrates yet another example of an apparatus for controlling track pitch locally on a tape being read by a tape drive. In this example, the overall tape tension is held constant, while an actuator is utilized to modulate tape tension in a localized region on the tape.

FIG. 21 illustrates another example of an apparatus for controlling track pitch locally on a tape being read by a tape drive. In this example, the overall tape tension is held constant, and thereby, eliminating various adverse effects, such as excessive later tape motion and tape damages that can result due excessive stretching. The apparatus utilizes the flexible properties of tape media to modify the written track pitch to support multi-channel high track density recording. The position of the tracks 152 relative to the magnetic read-head 154, which may include both write and read cores, is extracted from the signal collected by the read-head. The apparatus 156 controls the operating point of the pitch controls system in a manner that provide a core pitch match between the cores across the read-head 154 and the written tracks 152 on the tape (i.e., matching the transducers 158 on the read-head 154 to the written tracks 152 on the tape 160). In one variation, the system utilizes adaptive learning to control the track pitch on the tape. This configuration may allow a multi-channel drive to operate at higher track densities and across a wider range of humidity and temperatures.

As illustrated in FIG. 21, a series of magnetic transducers 158 are positioned on the magnetic read-head 154 to detect changes in magnetic flux in the plurality of written tracks 152 on the magnetic tape 160. The actuator 164 comprises a roller configured to apply pressure to a localized region of the tape 160. In this example, the roller 164 applies pressure onto a localized region with a width of $W_3$, where $W_3$ is less than the width of tape $W_4$. The roller 164 is configured such that by rotating the roller along its axis, the system can vary the amount the roller 164 is displaced towards or retracted from the surface of the tape 160. In one variation, as the roller is rotated in the counter clockwise direction 166, the roller displaces a contacting interface 168 towards the tape surface, resulting in an increase in the depression induced by the roller 164. As the roller 164 is rotated in the clockwise direction, the roller displaces the contacting interface away from the tape surface, resulting in a decrease in the depression induced by the roller.

Figure 22:
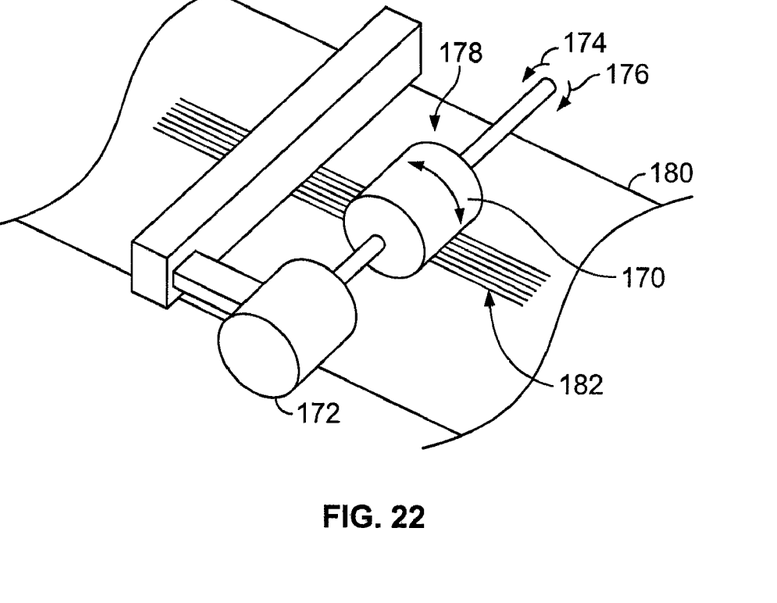
FIG. 22 illustrates one design variation where the actuator comprises a rollable drum. By controlling the orientation of the rollable drum, the controller in the apparatus is able to control the tape tension in a localized region surround the area of the tape being read by the magnetic read-head, and thereby modify the track pitch locally.

In one variation, the roller comprises a rollable drum 170, FIG. 22. The rollable drum 170 has a cross-section area of a compressed circle (e.g., oval, etc.). A step motor 172 (or other displacement mechanism) is coupled to the axis of the rollable drum 170 to control the position/rotation of the drum 170. By rotating the drum 170 in the counter clockwise direction 174, thus forcing the elongated section of the drum into the surface 178 of the tape 180, one can induce stretching of the tape in a localized region in and surrounding the area when the drum 170 contacts the tape. By modulating the position of the drum 170, the apparatus can control the track pitch of the written tracks 182 in the localized region.

In another design, a tape drive is configured to utilize pre-written servo track as reference to adjust the lateral position of the tape and/or the overall tension of the tape, while at the same time implements track pitch control function to modulate track pitch in a localized region on the tape. For example, the pre-written servo track may be written in a controlled environment with controlled tension. The tape drive can then adjust the tape's lateral position and/or overall tension during initial write as well as subsequent reads, minimizing the required tension spread for compensation. An actuator is utilized simultaneously to fine tune the track pitch to ensure that the data tracks on the tape matches the corresponding magnetic transducers on the read-head.

Figure 23:
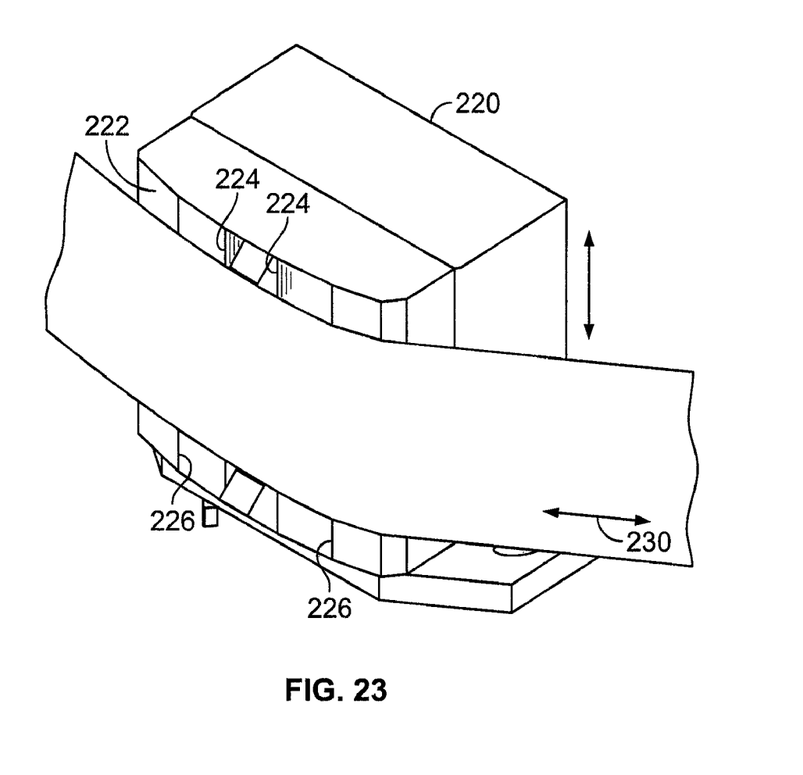
FIG. 23 is a perspective view showing one variation of a magnetic read-head having a pair of data islands, mini-outriggers and primary outriggers. The contour and surface characteristics of the read-head promotes the tape to maintain contact with the read-head when the tape is passed under the read-head at high speed.

In another variation, a read-head with a contour for facilitating and/or inducing read-head to tape contact, when the tape is passed under the read-head at high speed, is implemented on the tape drive along with the pitch control function. For example, a read-head having a plurality of active data islands and a desirable wrap angle, as shown in FIG. 23, can be implemented in the tape drive. The exemplary magnetic read-head 220 includes active data islands 224 having mini-outriggers (not shown). The magnetic read-head 220 comprises both read and write transducers, wherein a given section of the tape is first written upon by write transducers, and thereafter checked by read transducers. A tape 230 is drawn over the support surface 222 and the surfaces of islands 224, which include active device regions (not shown) having a plurality of transducers, e.g., read or write transducers. Additionally, tape 230 is drawn over primary outriggers 226. Active device regions may include, for example, a column of 16 write transducers and a column of 16 read transducers.

Further, an arrow shown on tape 230 indicates the reversible direction of tape 230 movements relative to magnetic read-head 220, and an arrow shown on read-head 220 indicates the relative movement of the read-head 220 to the path of tape 230 in a direction generally orthogonal (i.e., lateral movement) to the direction of tape 230 advancement. The movement of magnetic tape read-head 220 allows head 220 to align read and/or write transducers in the active regions to read and/or write information along one or more different data tracks arranged longitudinally along tape 230; for example, a suitable servo system may send position signals to a controller which in turn controls an actuator for translating read-head 220 in a lateral movement relative to tape 230. A second actuator (not shown), can be positioned next to the read-head 220 for applying a pressure onto a localized region of the tape 230 (in a direction perpendicular to the tape surface) to induce changes in the track pitches in an active regions to be read and/or write by the transducers in the read-head.

In another variation, a negative pressure flat head contour design is implemented in the apparatus. In yet another variation, the read-head contour is selected such that it can handle significant tension change in the tape while maintaining contact with the tape surface to read the data from the tape. As one of ordinary skill in the art having the benefit of this disclosure would appreciate, specific head contours may be implemented to permit the read-head to operate over the rage of resultant local tape surface tension changes.

Variations of the apparatus may be configured to correct various off-track pitch errors between the tape and the read-head, such as, errors resulting from interchanging between heads (e.g., mismatch between write-head and read-head), servo writer head core pitch error, and/or initial tape width variance (when the tape servo tracks were written), by temporarily changing track pitch on the written tracks to match the read-head. Moreover, variations of the apparatus may minimize tape edge damage and/or decrease problems associated with spooling at variable tension.

This invention has been described and specific examples of the invention have been portrayed. While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. Therefore, to the extent there are variations of the invention, which are within the spirit of the disclosure or equivalent to the inventions found in the claims, it is the intent that this patent will cover those variations as well. Finally, all publications and patent applications cited in this specification are herein incorporated by reference in their entirety as if each individual publication or patent application were specifically and individually put forth herein.

What is claimed as new and desired to be protected by Letters Patent of the United States is:

1. An apparatus comprising:
    a cluster of magnetic transducers, wherein the magnetic transducers are operable to read data on a magnetic tape; and
    an actuator, wherein the actuator is operable to apply a pressure in a direction perpendicular to a surface of the tape to a localized area on the magnetic tape that is adjacent to a contact area between the actuator and the magnetic tape to adjust distances between a plurality of tracks within the localized area on the magnetic tape.

2. The apparatus according to claim 1, further comprising:
    a controller, wherein the controller is operable to detect a first set of track pitches of the tracks on the magnetic tape, and further operable to vary the pressure on the magnetic tape based on the first set of track pitches such that a second set of track pitches is achieved on the tracks.

3. The apparatus according to claim 2, wherein the second set of track pitches corresponds to the distances between the magnetic transducers.

4. The apparatus according to claim 3, further comprising:
    a motor adapted to pass the tape under the magnetic transducers.

5. The apparatus according to claim 1, wherein the actuator comprises a roller.

6. The apparatus according to claim 1, wherein as the actuator is configured such that, as the actuator increases the pressure on the tape, the distances between the plurality of track on the magnetic tape increases.

7. The apparatus according to claim 2, wherein the controller is further operable to detect a servo track on the magnetic tape and modify a position of the magnetic tape laterally relative to the cluster of magnetic transducers.

8. An apparatus, comprising:
    a cluster of magnetic transducers operable to read data on the a magnetic tape;
    a controller operable to continuously monitor track pitch or track position information from the magnetic transducers and control pressure applied to the magnetic tape for adjusting track pitch of the magnetic tape based on the track pitch or track position information; and
    an actuator operable to adjust the lateral width of the magnetic tape by applying a variable pressure gradient to a localize region of the magnetic tape that is adjacent to a contact area between the actuator and the magnetic tape, wherein the variable pressure is controlled by the controller.

* * * * *